United States Patent [19]

Kerr

[11] Patent Number: 5,018,406
[45] Date of Patent: May 28, 1991

[54] MECHANICAL LOCKING DEVICE

[75] Inventor: Peter Kerr, Columbus, Ohio

[73] Assignee: Schuler Incorporated, Columbus, Ohio

[21] Appl. No.: 437,126

[22] Filed: Nov. 14, 1989

[51] Int. Cl.$^5$ ............................................. F16H 53/06
[52] U.S. Cl. .................................................. 74/569
[58] Field of Search .................................. 74/569, 110

[56] References Cited

U.S. PATENT DOCUMENTS

| 2,481,648 | 9/1949 | Dehn . | |
|---|---|---|---|
| 3,042,289 | 7/1962 | Mikina . | |
| 4,225,124 | 9/1980 | Pollak . | |
| 4,270,398 | 6/1981 | Arnold . | |
| 4,669,324 | 6/1987 | deMey et al. . | |
| 4,824,087 | 4/1989 | Hannel | 74/110 X |
| 4,856,359 | 8/1989 | Krause | 74/110 |
| 4,890,541 | 1/1990 | Spooner | 74/110 X |

Primary Examiner—Rodney M. Lindsey
Attorney, Agent, or Firm—Vorys, Sater, Seymour and Pease

[57] ABSTRACT

Included in the locking apparatus is a housing assembly having structure defining paths of movement for a latch pin, shuttle pin and support pin. The latch and support pins have inclined surfaces which engage the shuttle pin and the latter engages housing assembly structure. The foregoing structure is constructed and arranged to provide a locking apparatus which permits sliding movement of the support member in one direction and automatic locking of the support member when moving in an opposite direction.

7 Claims, 2 Drawing Sheets

MECHANICAL LOCKING DEVICE

BACKGROUND OF THE INVENTION

The present invention relates generally to a mechanism for allowing movement of a slidable component in one direction and automatically limiting its movement in another direction.

In industry, numerous occasions arise for moving a slidable member in one direction and limiting its movement in an opposite direction. Moreover, it is desirable to provide a locking or clamping apparatus which is simple and economical in construction as well as automatic in its operation. Numerous devices have been proposed in this field for providing selective clamping action. Exemplary devices of this type are described in U.S. Pat. Nos.: 2,481,648; 3,042,289; 4,032,803; 4,669,324; 4,691,724; 4,270,398; and 4,225,124. For instance, U.S. Pat. No. 3,042,289 describes a loader/unloader mechanism utilizing a plurality of spherical members which simultaneously engage opposed inclined planes on relatively oppositely moveable members. The action of the inclined planes, balls and friction forces is such as to make this apparatus capable of providing a force amplification, whereby heavy loads can be supported by considerably less force.

However, none of the known devices including those noted above provide for an apparatus having few components which permits displacement of a supporting member in one direction and automatic locking of the member by the same components in another direction.

SUMMARY OF THE INVENTION

According to the present invention there is provided a mechanical locking apparatus which provides for significant advantages over the prior art.

Essentially, the locking apparatus includes a housing means for defining first and second generally parallel paths of movement and a third path of movement that is generally normal to and between the first and second paths. A first means is mounted in the housing means for reciprocable movement in first and second directions along the first path and has a first inclined surface at a preselected angle relative to a longitudinal axis of the first path. A second means is mounted in the housing means for reciprocable movement in the first and second directions along a second path and has a second inclined surface at a preselected angle relative to a longitudinal axis of the second path. A third means is mounted in the housing means for bidirectional movement in the housing means along the third path. The third means is simultaneously engageable by and between the first and second inclined surfaces. The first and second inclined surfaces have their respective preselected angles established in a predetermined locking ratio with one another so that the second means is moveable in a first direction along the second path in response to movement of the first means along the first path in a first direction. Movement of the second means in the first direction is effected by an axial force applied by the third means in response to the first means moving in the first direction. The predetermined locking ratio of angles also allows automatic locking of the second means when moving in the second direction as the third means is stopped as a result of the first and second inclined surfaces and the housing means.

In an illustrated embodiment, the first means is defined by a latch pin which is preloaded by a spring or hydraulic device. The second means is characterized by a support pin which engages the locking force or load to be resisted. The third means is defined as a cylindrical shuttle pin member having its surfaces engageable with the first and second inclined surfaces of the latch and support pins; respectively. The support pin can move upwardly in response to co-directional movement of the latch pin and the preloaded spring. As displacement of the latch pin occurs, the shuttle pin is caused to move axially and thereby raise the support pin to a supporting position. Upon application of a clamping load to the support pin, the latter moves downwardly in the second direction. The downward force is distributed equally via the shuttle pin to the latch pin and the housing means and the shuttle pin does not move. The prevention is achieved as a result of the action of the inclined surfaces and the housing means, whereby the shuttle pin creates balanced forces thereon. The balancing of forces inhibits movement of the shuttle pin in the opposite direction.

Among the other objects and features of the present invention are the provisions of an improved mechanical locking apparatus for automatically locking a slidable member in one direction, while permitting movement in the opposite direction; the provision of an improved automatic mechanical locking apparatus of the foregoing type which is simple in construction and easy to operate; and the provision of an improved automatic mechanical locking apparatus of the foregoing type which is easily able to effect unlocking of the locking arrangement.

Still other objects and further scope of applicability of the present invention will become apparent from the detailed description to follow when taken in conjunction with the accompanying drawings in which like parts are designated by like reference numerals throughout the several views.

DETAILED DESCRIPTION

Figure 3:
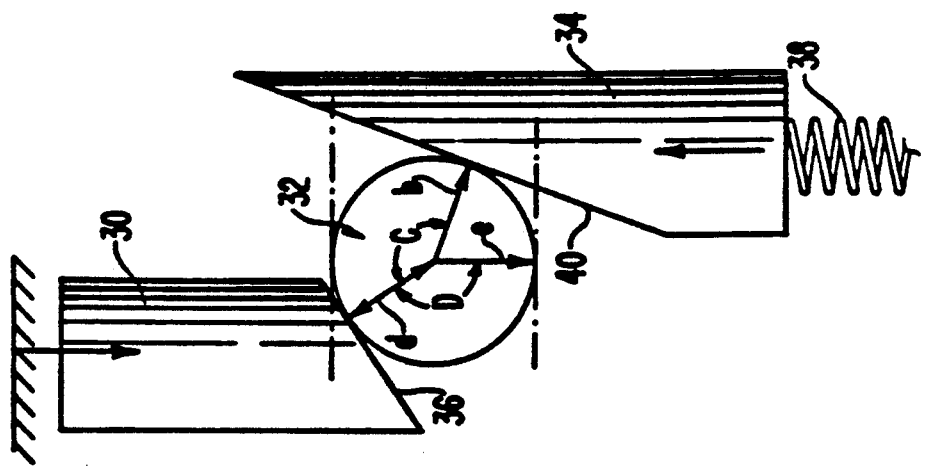
FIG. 3 is a diagrammatic schematic view similar to FIG. 2 illustrating another mode of operation of the present invention; and, FIG. 4 is a front pictorial view of an embodiment of a loading arrangement utilizing mechanical locking apparatus of the present invention.
Figure 2:
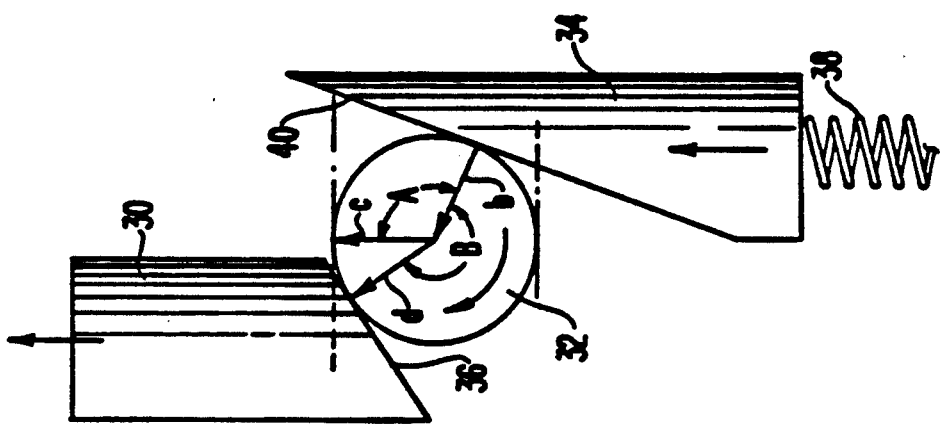
FIG. 2 is a diagrammatic schematic view illustrating one mode of operation of the present invention.
Figure 1:
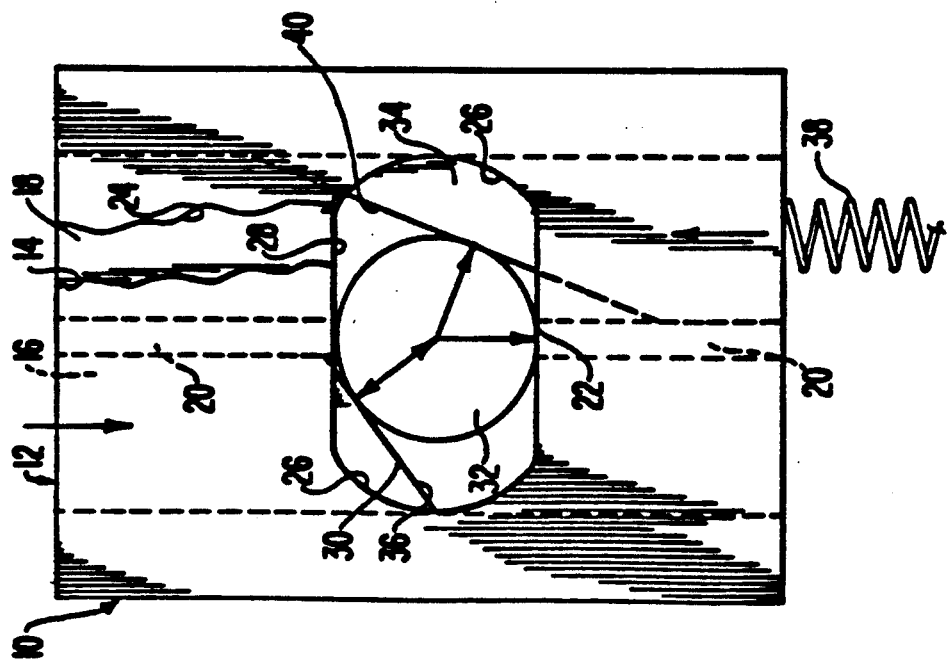
FIG. 1 is an elevational schematic view, partly broken, away of a preferred embodiment of the present invention.

Reference is made to FIGS. 1–3 of the drawings for illustrating one preferred embodiment of the present locking mechanism or apparatus 10. As depicted, the locking apparatus 10 includes a housing means or assembly 12 comprising a block body 14 defining adjacent and generally parallel bores 16 and 18 which are separated by partition walls 20. The partition walls 20 define an opening 22 therebetween. A plate member 24 of the housing assembly 12 is secured to the block body 14 and includes a generally horizontally disposed slot 26 having the size and configuration depicted. The block body 14 also includes a recess 28 only a part of which is shown in FIG. 1. The recess 28 is aligned with the slot 26 and has the same general configuration. Each of the respective vertically extending bores 16, 18 defines a respective path of movement. The arrangement of the slot 26 and recess 28 defines a third path of movement generally perpendicular to the longitudinal axes of the pair of bores 16, 18.

A support pin 30, shuttle pin 32, and latch pin 34 are disposed for selective movement within the housing assembly 12. These components are arranged in such a fashion, as will be described, for effecting selective movement of the support pin 30 in one direction of displacement, while locking the support pin against displacement in the opposite direction. Each of the cylindrical pins 30-34 is made of a suitably hard material, such as steel, which is capable of withstanding significant loads being exerted thereon. The support pin 30, shuttle pin 32 and latch pin 34 can be bathed in oil for purposes of lubrication.

Initially referring to the support pin 30, it is provided with an inclined surface 36 having a predetermined angle relative to a longitudinal axis of the support pin. The inclined surface 36 is engageable so as to have a line contact with the shuttle pin 32. The support pin 30, as noted, is bidirectionally moveable in the bore 16 although, as will be described, its movement in a downward direction is limited by a locking action to be described.

The latch pin 34 is bidirectionally moveable in the bore 18. In this embodiment the latch pin 34 is preferably provided with a pre-loaded force provided by a compression spring 38. Alternatively, hydraulic means or the like can provide an upward force of the same degree and manner as the spring 38. In this embodiment, the preloading force provides a nominal upward force, for instance, of 100 pounds against the bottom of the latch pin 34. The relatively small preload noted is sufficient for purposes of removing all tolerances between the working components of the locking apparatus. Moreover, the preload permits easy release of the pins 30-34 upon removal of the loading force that is applied to the support pin 30. The latch pin 34 is provided with an inclined surface 40 which has a predetermined angle relative to a longitudinal axis thereof. The inclined surface 40 is also continuously engageable in a line contact with the cylindrical shuttle pin 32. The lines of contact of the pin 32 will be in parallel planes and this assists in achieving the noted locking action. The cylindrical shuttle pin 32 has its opposite ends guided within the slot 26 and recess 28 for bidirectional movement along the third path through the opening 22 between the partition walls 20. This path of bidirectional shuttle movement is generally perpendicular to the axis of movement of both the pins 30 and 34. Although perpendicularity is desired, the present invention is not limited to such an orientation of the third path since other orientations thereof are permissible so long as, of course, the locking mechanism 10 can perform the functions set forth herein. Although the shuttle pin 32 is cylindrical such a configuration need not be the case.

According to the present invention, the preselected angles of the inclined surfaces 36, 40 define a locking ratio which is predetermined to provide the desired locking action. In the illustrated embodiment, the inclined surface 36 is at an angle of about 55° relative to the longitudinal axis of the support pin 30, whereas the inclined surface 40 is at an angle of about 20° relative to a longitudinal axis of the latch pin 34. According to this embodiment, the locking ratio of the angles of the surfaces 36, 40 allows locking of the support pin 30 when a load is applied thereto. In this particular invention, the locking ratio is selected to be of such a value that when the load applied to the support pin, such load is distributed evenly, as will be described, to create a mechanical locking action. The locking ratio can be varied so long as a locking action is achieved. Ratios outside the locking range will yield an apparatus which amplifies the forces which the support pin 30 can resist.

The foregoing construction of the locking mechanism 10 operates in the following manner. Whenever it is desired to use the present invention in a latching mode, free upward linear movement of the latch pin 34 is permitted as a result of the preloading. Because of the preloaded force on the latch pin 34 and as a result of the 20° degree inclined surface 36 there are created unequal angular loads on the shuttle pin 32. Accordingly, there is produced a resulting axial force which rotates and axially displaces the shuttle pin 32 against the support pin 30. Consequently, the support pin 30 is displaced upwardly. The unequal angular loads on the shuttle pin 32 are shown in FIG. 2. As depicted, angle A is from line b which is normal to the line contact that the shuttle pin 32 has with the inclined surface 40, to a line c which is normal to the bottom of a wall defining the slot 26. Angle B extends from a line d, which is normal to the line contact the shuttle pin 32 has with inclined surface 36, to the line b. The unbalance arises since angle B is greater than angle A. Accordingly, the support pin 30 is raised to a position, whereat it contacts a load (not shown).

When the upward movement of the support pin 30 is stopped, such as by a load, the resulting downward movement of the support pin will be locked as shown in FIG. 3 by interaction of the pin 30 against the shuttle pin 32, which in turn interacts with the inclined surface 40, and the body block 14 and the plate 24. Further, in this connection the shuttle pin 32 engages a wall of the plate 24 defining the slot 26 and that part of the body block 14 defining the recess 28. In this latter mode, when a downward or locking load is applied to the support pin 30, the shuttle pin 32 moves rightwardly until the locking load is equally angularly distributed between the latch pin 34 and the plate 24, as shown in FIG. 3. Accordingly, angles C and D are equal (e.g., 145 ). Angle C extends from line b to line d, while angle D extends from line d to line e, which is normal to the bottom wall defining the slot 26. Because the load is equally distributed, a mechanical lock is achieved since at this point there is no axial load applied on the shuttle pin 32. Consequently, this equal load distribution creates a mechanical locking on the support pin 30.

To release the locking action, the load can be relieved and/or the latch pin 34 can be moved downwardly against the spring 38 by a suitable mechanism (not shown). If a hydraulic device, for instance, were used instead of a spring, then movement of a piston could effect downward movement of the latch pin and release of the locking action.

Figure 4:
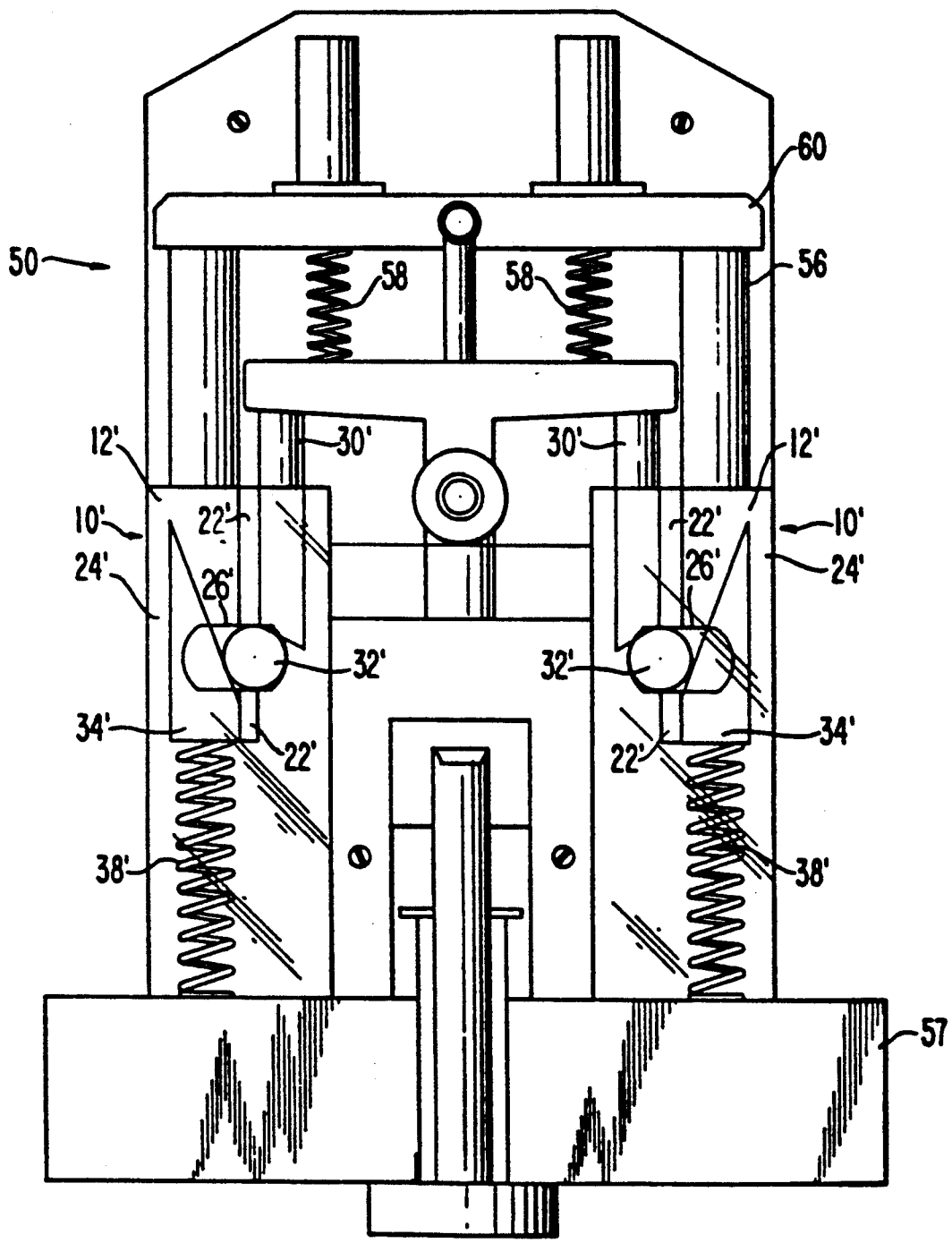

Reference is now made to FIG. 4 for illustrating a loading arrangement 50 which shows utilization of a pair of locking apparatus 10' of the type described above. Structure of this embodiment like that indicated above will be indicated by like reference numerals with, however, the addition of a prime marking. In this embodiment, a transparent plate 24' is shown for purposes of more clearly appreciating the nature of the construction of the locking apparatus used in this application. Four loading arrangements, (only one of which is shown) are provided to support a die table (not shown)

which is mounted for vertical movement. Secured to the table is a plurality of T-bars 52, an end portion of one of which is shown in FIG. 4. It will be understood that a loading arrangement 50 is associated with each end of a T-bar 52. A hydraulic table piston (not shown) is arranged for effecting the raising and lowering of the table and therefore the T-bars 52.

The loading arrangement 50 includes a housing arrangement including a lower horizontal supporting bracket 54, a pair of parallel and spaced apart locking apparatus 10' having their respective support pins 30' engageable with flanges of the T-bar 52 when the table is allowed to move downwardly by operation of the table piston. The housing assemblies 12' of locking mechanism 10' are secured to an upstanding support member 56. Springs 58 are interposed between an upper horizontal bracket 60 and a top surface of the T-bar 52 as illustrated.

During operation when a load is placed on the table, the T-bar 52 lowers and engages both the supporting pins 30'. Owing to the locking action provided by each locking apparatus 10', as noted earlier, downward movement of the table is prevented. When the table piston is actuated, the T-bars are lifted and locking is released.

According to this invention there are numerous applications for a locking mechanism made according to this invention.

Since certain changes may be made in the above described apparatus without departing from the scope of the present invention herein involved, it is intended that all matter contained in the description or shown in the accompanying drawings shall be interpreted as illustrative and not in a limiting sense.

What is claimed is:

1. A mechanical locking apparatus comprising:
   housing means for defining first and second generally parallel paths of movement therein and a third path of movement generally normal to and between said first and second paths of movement;
   first means mounted in said housing means for movement along said first path for reciprocable movement in first and second directions along said first path and having a first inclined surface at a preselected angle relative to an axis of movement of said first path;
   second means mounted in said housing means for movement along the second path for reciprocable movement in first and second directions along said second path and having a second inclined surface at a preselected angle relative to an axis of movement of said second path;
   third means mounted in said housing means for free bidirectional movement in said housing means along said third path, said third means having line contact with and being simultaneously engageable by said inclined surfaces; and,
   said first and second inclined surfaces having their respective preselected angles established in a predetermined locking ratio with one another so that said second means is movable in a first direction along said second path in response to movement of said first means in said first direction which movement effects an axial force on said third means along said third path and causes movement of said second means in said first direction; movement of said second means in said second direction in response to a locking force is restricted by automatic locking such that said locking is effected by the locking force being generally equally angularly distributed by said third means between said housing means and said first means.

2. The locking apparatus of claim 1 further including means for preloading said first means in said first direction along said first path so as to remove all tolerances between said first, second, third and housing means.

3. The locking apparatus of claim 2 wherein said preloading means insures release of the locking action upon removal of the locking force.

4. The locking apparatus of claim 1 wherein said locking ratio is in a range which obtains said locking action.

5. The locking apparatus of claim 3 wherein said first, second and third means are cylindrical pins.

6. The locking apparatus of claim 5 wherein said housing means defines bores for said first and second cylindrical pins.

7. The locking apparatus of claim 6 wherein said housing means defines surfaces for supporting said third pin for movement along said third path and for providing a reaction surface for distributed locking forces on said third pin.

* * * * *